United States Patent
Albert et al.

(10) Patent No.: US 7,502,516 B2
(45) Date of Patent: Mar. 10, 2009

(54) SYSTEM AND METHOD FOR PROVIDING AN EXTENSIBLE CODEC ARCHITECTURE FOR DIGITAL IMAGES

(75) Inventors: David Albert, Woodinville, WA (US); Frank Alva Krueger, Bothell, WA (US); Rajat Goel, Seattle, WA (US); Peter A. Gurevich, Woodinville, WA (US); Anthony John Rolls Hodsdon, Seattle, WA (US); Radu C. Magarint, Bothell, WA (US); Thomas W. Olsen, Issaquah, WA (US); Rahul V. Patil, Woodinville, WA (US); Cyra S. Richardson, Bellevue, WA (US); Robert Earl Sinclair, II, Sammamish, WA (US); Richard S. Turner, Jr., Woodinville, WA (US); Eric Vandenberg, Seattle, WA (US); Robert A. Wlodarczyk, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 798 days.

(21) Appl. No.: 11/062,301

(22) Filed: Feb. 17, 2005

(65) Prior Publication Data

US 2006/0184783 A1 Aug. 17, 2006

(51) Int. Cl.
*G06K 9/36* (2006.01)
*G06K 9/46* (2006.01)
(52) U.S. Cl. ...................... 382/239; 382/232
(58) Field of Classification Search .............. None
See application file for complete search history.

(56) References Cited

U.S. PATENT DOCUMENTS

| | | | | |
|---|---|---|---|---|
| 5,583,665 A * | 12/1996 | Gregory et al. | ............. | 358/504 |
| 6,587,735 B1 * | 7/2003 | Yaguchi | ........................ | 700/2 |
| 6,963,898 B2 * | 11/2005 | Yoshimine et al. | .......... | 709/203 |
| 7,038,810 B1 * | 5/2006 | Yamazoe et al. | ............. | 358/1.9 |
| 2002/0046315 A1 * | 4/2002 | Miller et al. | .................... | 711/1 |
| 2002/0072368 A1 * | 6/2002 | Sawada et al. | ............... | 455/435 |
| 2002/0114525 A1 * | 8/2002 | Bolle et al. | ................. | 382/232 |
| 2004/0045030 A1 * | 3/2004 | Reynolds et al. | ............ | 725/110 |
| 2005/0073575 A1 * | 4/2005 | Thacher et al. | ........... | 348/14.13 |
| 2005/0153746 A1 * | 7/2005 | Yoon | .......................... | 455/566 |

OTHER PUBLICATIONS

Adobe System Incorporated, Adobe Photoshop 7.0 User Guide, 2002 Introduction, Chapters 3, 15.

* cited by examiner

*Primary Examiner*—Matthew C Bella
*Assistant Examiner*—Yuzhen Ge
(74) *Attorney, Agent, or Firm*—Workman Nydegger (57) ABSTRACT

An improved system and method for an extensible codec architecture for digital images is provided. Executable software code may be operably coupled to a codec manager for requesting imaging operations to be performed on a digital image. The codec manager may receive the request to perform an imaging operation on the digital image and may select an imaging component, such as a codec, from one or more imaging components registered in the computer system for performing an imaging operation on the digital image. An arbitration manager may include functionality for requesting enumeration of the operations an imaging component may perform on a particular digital image. One or more pixel format converters may then convert the pixel format in the digital image to a pixel format supported by an imaging component installed on the system.

20 Claims, 6 Drawing Sheets

SYSTEM AND METHOD FOR PROVIDING AN EXTENSIBLE CODEC ARCHITECTURE FOR DIGITAL IMAGES

FIELD OF THE INVENTION

The invention relates generally to computer systems, and more particularly to an improved system and method for providing an extensible codec architecture for digital images.

BACKGROUND OF THE INVENTION

Image formats for digital images continue to evolve as the popularity of digital images grows. As applications for digital images expand, new image formats and extensions to industry standards for specific image formats emerge regularly. Additionally, manufacturers for imaging devices, such as digital camera manufacturers, may offer new image formats or extensions to image formats that may be specific to a particular imaging device. However, there may be a fixed set of codecs and pixel formats for images typically installed on a computer system that may be available to an application. And the set of codecs provided to encode and decode an image format may only offer fixed implementations designed for existing formats such as standard image types. When a new image format or an extension to an image format may be introduced, the implementation of an encoder and decoder in a codec must be built for the new image format or must be updated to handle the extension to an image format. Unfortunately, the process for updating a codec is expensive and time consuming.

Existing computer system architectures are unable to seamlessly integrate or automatically install additional codecs, either for standard or proprietary image formats, for use in the imaging pipeline of a computer system. Another problem with existing architectures is that a computer system may have a fixed number of specified pixel formats that available codecs in the computer system can recognize. If a decoder was created that introduced a new pixel format for an image type in the computer system, the computer system would not be able to recognize the new pixel format for the image type. Moreover, the tight coupling and dependencies between a codec and a particular image format prevent easy reuse of executable code for encoding and decoding images for different image formats that may be included in a single image file of multiple images.

What is needed is a way for a computer system to easily adapt to the introduction of new image formats without having to release a new implementation of a codec in order to support new image formats. Such a system and method should also be able to seamlessly support applications using third party implementations of image formats and extensions to existing image formats and should allow for automatic conversion of new pixel image formats to pixel formats recognizable by codecs installed on the computer system.

SUMMARY OF THE INVENTION

Briefly, the present invention provides an improved system and method for an extensible codec architecture for digital images. To this end, executable software code may be operably coupled to a codec manager for requesting imaging operations to be performed on a digital image. The codec manager may receive the request to perform an imaging operation on the digital image and may select an imaging component, such as a codec, from one or more imaging components registered in the computer system for performing an imaging operation on the digital image. For example, the codec manager may include one or more codecs that may each have a decoder and an encoder. The codec manager may also include an arbitration manager and one or more pixel converters.

The arbitration manager may include functionality for selecting an imaging component to perform a requested operation among several imaging components registered in the computer system and may request that each imaging component enumerate the operations it may perform on a particular digital image. If there may not be an imaging component registered in the computer system that may perform the imaging operation using the pixel format of the image file, then an imaging component may be selected that may perform the requested imaging operation for a different pixel format for the digital image type. A pixel format conversion may then be performed using one or more pixel format converters operably coupled to the codec to convert the pixel format in the digital image to the pixel format supported by the codec component selected for performing the requested imaging operation on the digital image.

As part of installation, an imaging component may install one or more pixel format converters, including a pixel format converter for converting to and from that imaging component's pixel format and a common pixel format. Furthermore, imaging components may register information in a registry during installation. In one embodiment, the information in the system registry may include information about imaging components and pixel format converters that are available in the computer system. By using information registered by imaging components that are installed in the computer system, an appropriate imaging component for performing a requested imaging operation may be selected without first having to instantiate the imaging component.

Advantageously, the system and method may flexibly support the addition of new image formats and new pixel formats for digital images. The framework provided may also seamlessly support applications using third party implementations of image formats and extensions to existing image formats. Moreover, the system and method may perform automatic conversion of new pixel image formats to pixel image formats that may be recognizable by imaging components installed on the computer system. Other advantages will become apparent from the following detailed description when taken in conjunction with the drawings, in which:

DETAILED DESCRIPTION

Exemplary Operating Environment

Figure 1:
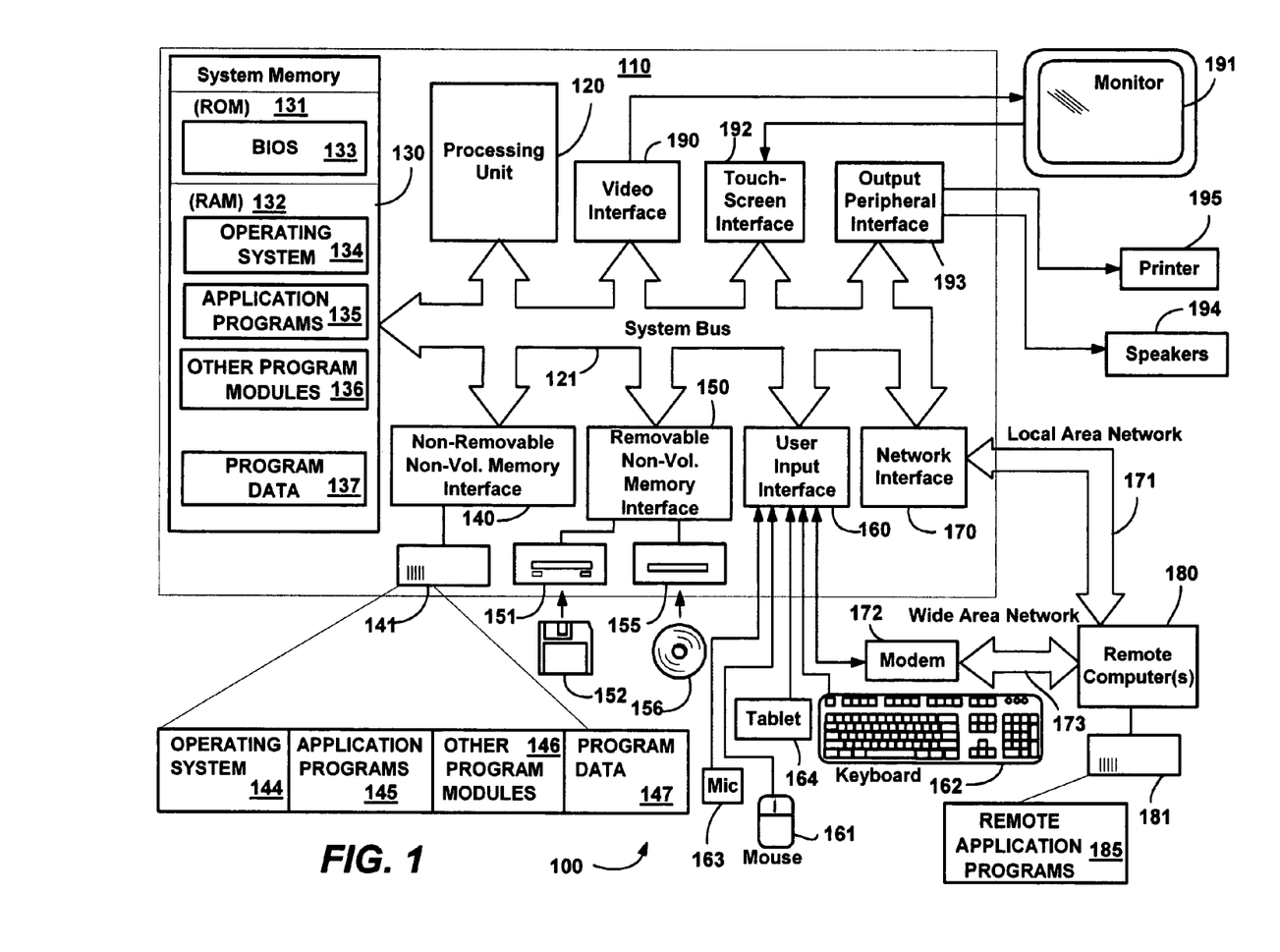
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, headless servers, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or other devices including a device that contains a biometric sensor, environmental sensor, position sensor, or other type of sensor. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like connected to the system bus 121 via touch screen interface 192. Note that the monitor and/or touch screen panel can be physically coupled to a housing in which the computing device 110 is incorporated, such as in a tablet-type personal computer. In addition, computers such as the computing device 110 may also include other peripheral output devices such as speakers 194 and printer 195, which may be connected through an output peripheral interface 193 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

An Extensible Codec Architecture for Digital Images

The present invention is generally directed towards a system and method for providing an extensible codec architecture for digital images. The system and method may advantageously allow the installation and discovery of new imaging components that may enumerate their capabilities for performing imaging operations on a digital image. By registering imaging component information during installation, appropriate imaging components may be discovered for performing requested imaging operations without having to instantiate the imaging component. As will be seen, the system and method may flexibly support the addition of new image formats and new pixel formats for digital images, and may further perform automatic conversion of new pixel image formats to pixel image formats that may be recognizable by imaging components installed on the computer system. As will be understood, the various block diagrams, flow charts and scenarios described herein are only examples, and there are many other scenarios to which the present invention will apply.

Figure 2:
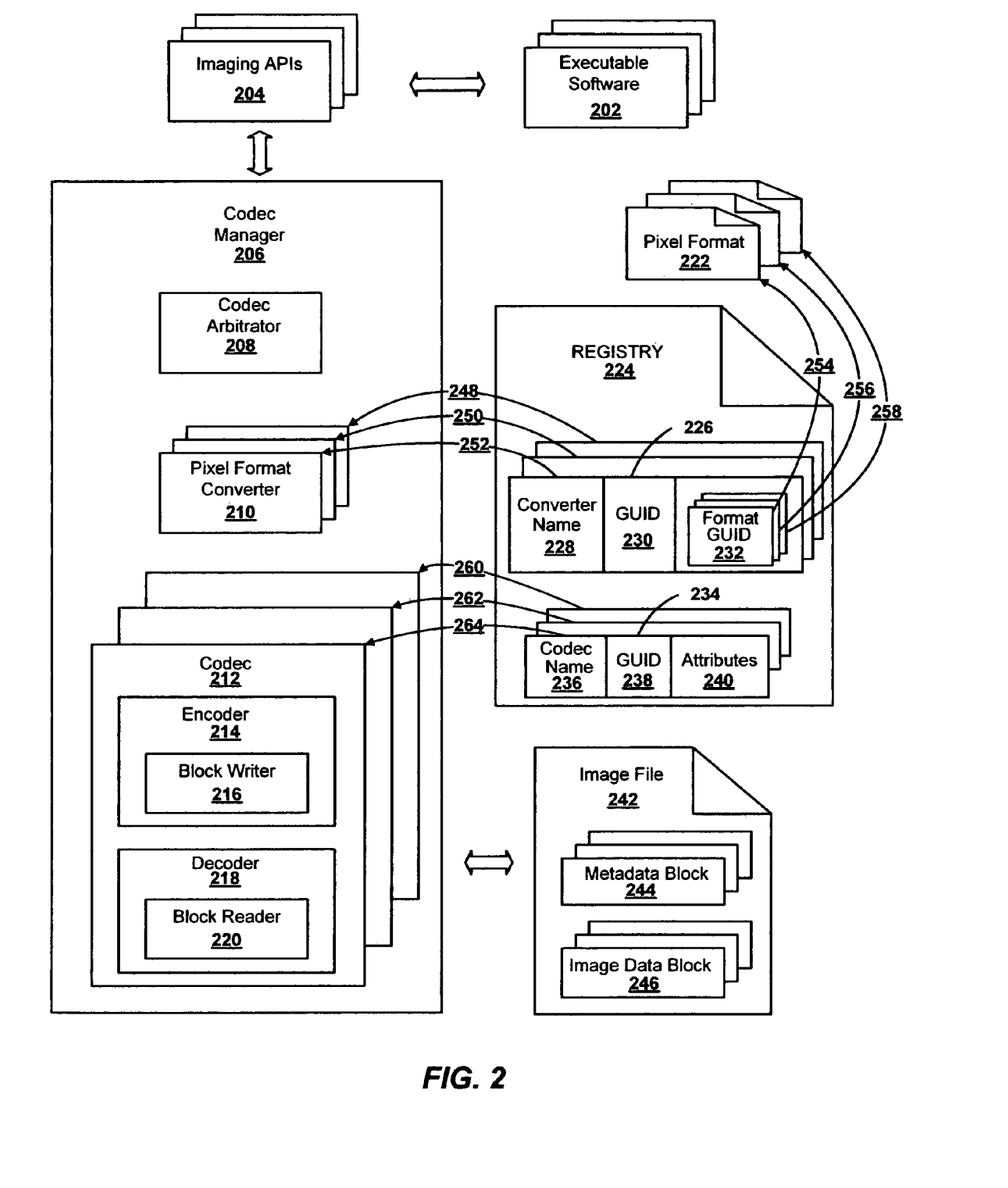
FIG. 2 is a block diagram generally representing an exemplary architecture of system components in one embodiment of an extensible codec architecture for digital images, in accordance with an aspect of the present invention.

Turning to FIG. 2 of the drawings, there is shown a block diagram generally representing an exemplary architecture of system components in one embodiment of an extensible codec architecture for digital images. Those skilled in the art will appreciate that the functionality implemented within the blocks illustrated in the diagram may be implemented as separate components or the functionality of several or all of the blocks may be implemented within a single component. As an example, the functionality of a codec arbitrator 208 may be implemented in a separate component from codec manager 206.

Executable software 202 shown in FIG. 2 may request any number of operations to be performed with an image file, including decoding image data from and encoding image data in an image file. The executable software 202 may be operably coupled to imaging application programming interfaces (APIs) 204 for requesting an image to be decoded from an image file and for requesting an image to be encoded in an image file. The imaging APIs may, in turn, be operably coupled to a codec manager 206 that may discover and enumerate available codecs registered in the computer system and instantiate a selected codec for performing requested operations with an image file.

The codec manager 206 may include operably coupled imaging components such as a codec arbitrator 208, one or more pixel format converters 210, and one or more codecs 212. The codec manager 206, the codec arbitrator 208, a pixel format converter 210, and a codec 212 may each be any executable software code including a kernel component, an application program or application component, a component of a linked library, an object, and so forth. There may be a codec, such as codec 212, provided for each type of image file supported by the computer system. For example, there may be a codec for GIF, JPEG, PNG, TIFF, and other image file formats. Each codec may include an encoder 214 for encoding an image and a decoder 218 for decoding an image. An encoder 214, for example, may include a block writer 216 for writing pixels in an image block of an image file such as image file 242. A decoder 218 may include a block reader 220 for decoding an image block from an image file such as image file 242. An image file 242 may also include metadata blocks 244 that may describe an image encoded in one or more image data blocks 246.

Imaging components, such as a codec 212, may be installed and registered in a computer system using a registry such as registry 224. Registry 224 may be a file, an executable object, a database, or other persistent data structure. Registry 224 may include, among other system information, codec information 234 for codecs registered in the computer system and pixel format converter information 226 for pixel format converters registered in the computer system. Registering such imaging components may provide a way to select an appropriate imaging component for performing a requested imaging operation without first having to instantiate it. In one embodiment, a codec may write information about itself in the registry. The codec information 234 may include, for example, a codec name 236, a global unique identifier (GUID) 238 that may serve to uniquely identify the codec, and other attributes 240 such as the codec author's name, a description of the codec, a manufacturer's name, the image format, and so forth. For example, there may be codec information as illustrated by references 260, 262, 264 for each of the codecs 212 illustrated in FIG. 2. In various embodiments, an encoder may also be registered in the registry 224 by providing information such as the encoder name, an identifier of the encoder, and other attributes of the encoder; and, similarly, a decoder may be registered in the registry 224 by providing information such as the decoder name, an identifier of the decoder, and other attributes of the decoder.

At runtime, the information in the registry may be used to find a codec that may decode an image file without first having to instantiate the codec. In an embodiment, a comparison may be made between patterns registered by a codec for images that it may decode and an image file. A codec may provide any type of pattern for using in comparing with an image file, including masks. In one embodiment, a comparison may be made between patterns registered by a codec and header information in an image file.

The pattern match may result in discovering several different codecs registered in the computer system that may provide various operations for a particular image file. Codec arbitrator 208 may then provide functionality for selecting a codec to perform a requested operation among several codecs that may each be instantiated and that may each enumerate the operations it may perform on a particular image file. A decoder, for instance, may enumerate its capabilities in an embodiment by indicating attributes and/or operations it may perform on an image. These attributes and operations may include, whether the decoder was supplied by the same vendor of the encoder that encoded the image, whether the decoder may decode all the images in the image file, whether the decoder can decode some images in the image file, whether the decoder may enumerate metadata in the image file, and whether the decoder may decode a thumbnail in the image file. In various embodiments, codec arbitrator 208 may assign a weight for each operation that a decoder may perform and then may select the codec with the highest score representing the sum of the assigned weights.

Each codec that may handle an image type may support many pixel formats for that image type. However, if there is not any codec registered in the computer system that may decode a pixel format for a particular image, then a codec may be found that may decode a different pixel format for that type of image, and a pixel format converter may be used to convert the pixel format in the image to the pixel format that a decoder registered in the computer system may decode. Accordingly, codec manager 206 may include one or more operably coupled pixel format converters 210. Each of these pixel format converters 210 may also be registered in the computer system. Registry 224 may include pixel format converter information 226 for each registered pixel format converter. For example, there may be pixel format information as illustrated by references 248, 250, 252 for each of the pixel format converters 210 illustrated in FIG. 2. In an embodiment, the information for each pixel format converter in the registry may include the name of the converter 228, a GUID 230 that may serve to uniquely identify the converter, and a list of pixel formats GUIDs 232 that may each represent an identifier for an individual pixel format such as illustrated by references 254, 256, and 258 to each of the pixel formats 222 illustrated in FIG. 2. In various other embodiments, other attributes may be included with the information for each pixel format converter including vendor's name, an identifier of the executable code for the pixel format converter, and so forth.

Those skilled in the art will appreciate that the extensible codec architecture shown in FIG. 2 may be but one exemplary embodiment for practicing the present invention and that other computing system configurations may be used to implement the present invention. For example, a decoder may be provided without an encoder for an application that may decode an image in an image file but yet not encode information to an image file. As another example, in order to facilitate decoding and encoding any image pixel format created by a codec, a pixel format converter may be provided by each codec to convert to and from that codec's pixel format and one or more canonical formats such as 32 bit PARGB or 128 bit PABGR.

Figure 3:
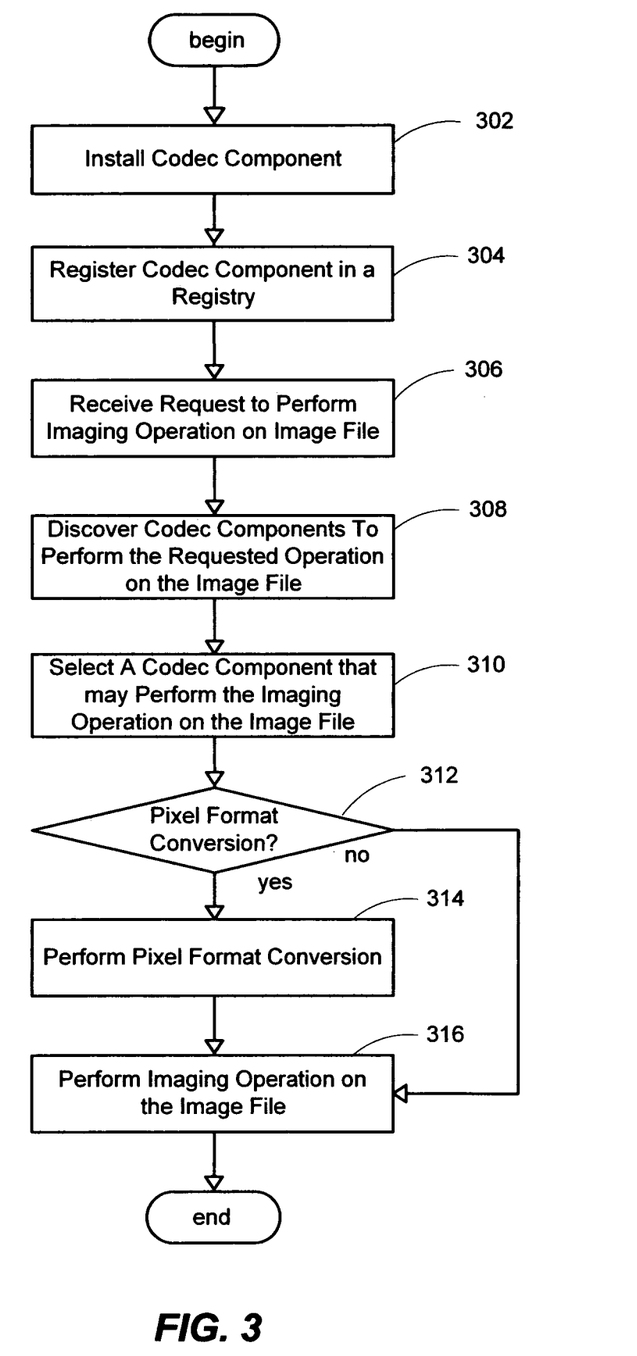
FIG. 3 is a flowchart generally representing exemplary steps undertaken in one embodiment of an extensible codec architecture for performing an imaging operation on an image file, in accordance with an aspect of the present invention.

FIG. 3 presents a flowchart generally representing exemplary steps undertaken in one embodiment of an extensible codec architecture for performing an imaging operation on an image file. Those skilled in the art will appreciate that an implementation may choose to perform these steps in a different order or may choose to perform only some of these steps for purposes of efficiency or flexibility, while achieving the same effect and without departing from the scope of the present invention. At step 302, a codec component may be installed. In various embodiments, a codec, a decoder and/or an encoder may be installed on a computer system. As used herein, a codec component may mean a codec, a decoder or an encoder. As part of installation, the codec component may install one or more pixel format converters, including a pixel format converter for converting to and from that codec component's pixel format and a common pixel format such as 32 bit PARGB or 128 bit PABGR.

Next, the codec component may be registered at step 304 in a registry. In an embodiment, a codec component may register itself as part of installation. During registration, a codec component may provide information about itself, including any image formats and pixel formats with which it may perform operations. The codec component information may include, for example, a name of the codec component, an identifier that may serve to uniquely identify the codec component, and other attributes such as the author's name of the codec component, a description of the codec component, a manufacturer's name, the image format, and so forth. In various embodiments, a codec component may also provide one or more patterns that may be used to identify an image file for which it may perform operations. For example, a codec component may register one or more patterns that may be compared with information in the headers of an image file. In one embodiment, a comparison may be made between patterns registered by a codec component and header information in an image file.

At step 306, a request may be received to perform an imaging operation on an image file. The request may be for any imaging operation supported by a codec component such as encoding an image or decoding an image. Next, a codec component may be discovered that may perform the requested imaging operation on the image file at step 308. In various embodiments, information registered by codec components may be used for discovering codec components registered in the computer system that may perform the requested imaging operation on the image file. For example, one or more patterns registered by a codec component may be matched against the image file to identify whether there may be any operations that the codec component may perform on the image file. Such operations may include decoding some images in the image file, encoding an image in the image file, enumerating metadata in the image file, encoding metadata in the image file, decoding a thumbnail in the image file, and so forth. As used herein, an imaging operation may mean any operation provided by an imaging component for manipulating a digital image, including manipulating metadata describing the digital image.

Figure 4:
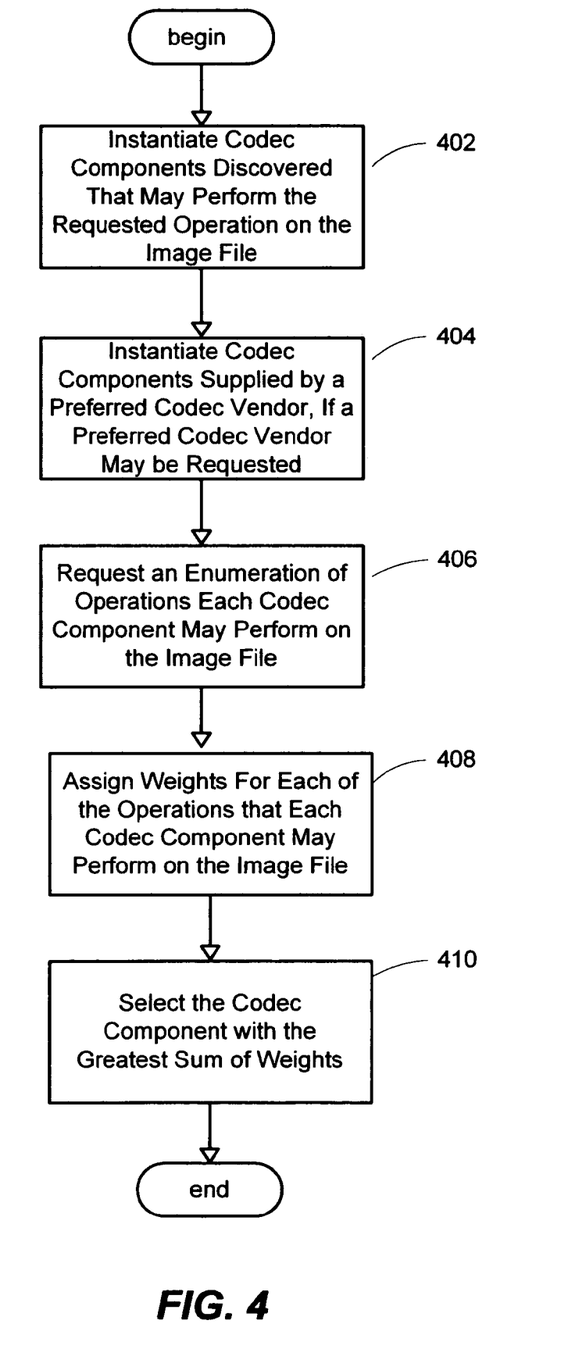
FIG. 4 is a flowchart generally representing exemplary steps undertaken in one embodiment for selecting a codec component for performing an imaging operation on an image file, in accordance with an aspect of the present invention.

A codec component may then be selected at step 310 from the codec components identified that may perform operations on the image file. In an embodiment, the codec components discovered using information from the registry may be requested to enumerate the operations each may perform on the image file. Then, a codec component may be selected based upon the type of operations each codec component may perform on the image file. FIG. 4 may present the steps undertaken in one such embodiment in greater detail. In another embodiment, an executable, such as an application program, may be provided a list of the codec components identified that may perform operations on the image file and the executable may select a codec component to be used for performing the operation on the image file.

Figure 5:
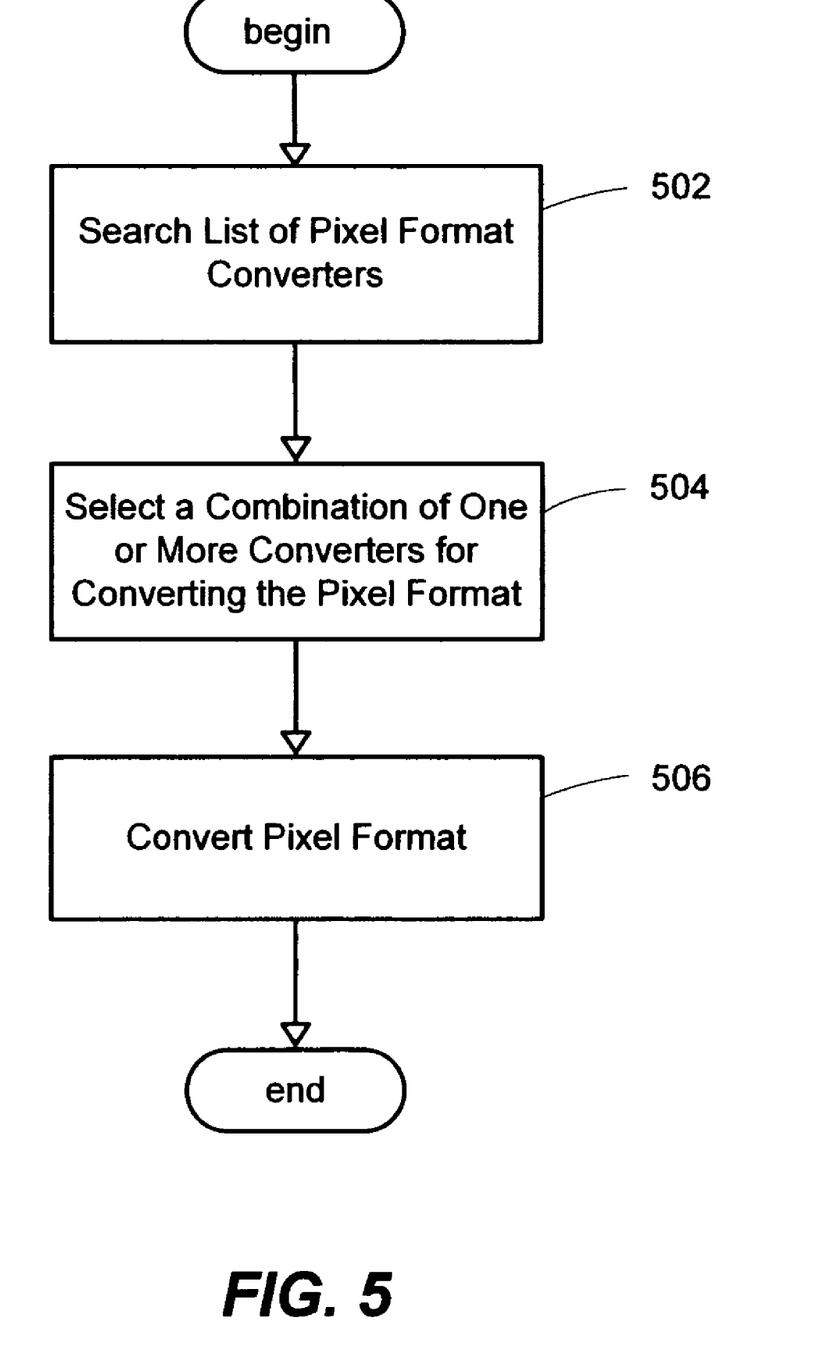
FIG. 5 is a flowchart generally representing exemplary steps undertaken in one embodiment for performing a pixel format conversion, in accordance with an aspect of the present invention.

It may then be determined at step 312 whether a pixel format conversion may be necessary for the codec component to perform the imaging operation on the image file. If the codec component selected at step 310 supports the pixel format of the image file, then the codec component may perform the requested operation on the image file without the need of a pixel format conversion. However, there may not be a codec component registered in the computer system that may perform the imaging operation using the pixel format of the image file, but a codec component may be selected at step 310 that may perform the requested imaging operation for a different pixel format for that type of image. In this case, it may be determined at step 312 that a pixel format conversion may be necessary for the codec component to perform the imaging operation on the image file and a pixel format conversion may be performed at step 314. In an embodiment, a pixel format converter may be used to convert the pixel format in the image to the pixel format supported by the codec component selected at step 310 for performing the requested imaging operation on the image file. FIG. 5 may present the steps undertaken in one such embodiment in greater detail.

If it may be determined at step 312 that a pixel format conversion may not be necessary for the codec component to perform the imaging operation on the image file, then the codec component may perform the imaging operation on the image file at step 316. After the codec component performs the imaging operation on the image file at step 318, processing may be finished.

In various embodiments, an application may use an application interface for installing and discovering an imaging component such as a codec for selection to perform an imaging operation on an image file. This may allow an application to use the extensible metadata architecture without making public an imaging component such as a codec component. Moreover, the imaging component may be uninstalled when the application quits so that the imaging component may not be available for another application to use it.

FIG. 4 presents a flowchart generally representing exemplary steps undertaken in one embodiment for selecting a codec component for performing an imaging operation on an image file. At step 402, codec components, identified at step 308 in FIG. 3 by using information from the registry, may be instantiated. At step 404, codec components supplied by a preferred codec vendor may then be instantiated if a preferred codec vendor may be indicated in the imaging operation request. At step 406, an enumeration of attributes and/or operations that each codec component may perform on an image file may be requested. In one embodiment, a codec component may invoke an interface for enumerating operations that a codec component may perform.

At step 408, weights may be assigned for each operation enumerated by each codec component that it may perform on the image file. In an embodiment, a codec component such as a decoder may respond that it may decode one frame, or it may decode metadata, or it may decode thumbnail, and so forth. Each of these operations may be assigned a weight. For example, a weight of 8 may be assigned for being able to decode all images in an image file; a weight of 4 may be assiged for being able to decode some images in an image file; a weight of 2 may be assigned for being able to decode a thumbnail image; and a weight of 1 may be assigned for being able to decode metadata.

After weights may be assigned for each operation enumerated by each codec component that it may perform on the image file, the codec component with the greatest sum of weights assigned to the enumerated operations that it may perform on the image file may be selected at step 410. After the codec component may be selected, processing may be finished.

FIG. 5 presents a flowchart generally representing exemplary steps undertaken in one embodiment for performing a pixel format conversion. For example, a pixel format conversion may be performed to convert the pixel format in an image to the pixel format supported by a codec component, such as the codec component selected at step 310 in FIG. 3 that may perform the requested imaging operation for a different pixel format for that type of image. At step 502, a list of pixel format converters may be searched for one or more pixel format converters that may perform conversion from the pixel format of the digital image to another pixel format. In an embodiment, the registry may include information about each pixel format converter installed in the computer system, including a list of pixel formats registered with that pixel format converter to which it may convert. For each pixel format that a pixel format converter may convert to, a list of pixel format converters may also be generated that may convert from that pixel format to another pixel format. In an embodiment, there may be one or more canonical pixel formats for which each imaging component may install one or more pixel format converters for converting between the canonical pixel formats and the pixel formats supported by the imaging component. This may provide a way to convert from a source pixel format to one or more intermediate pixel formats and then to convert to a destination pixel format.

Figure 6:
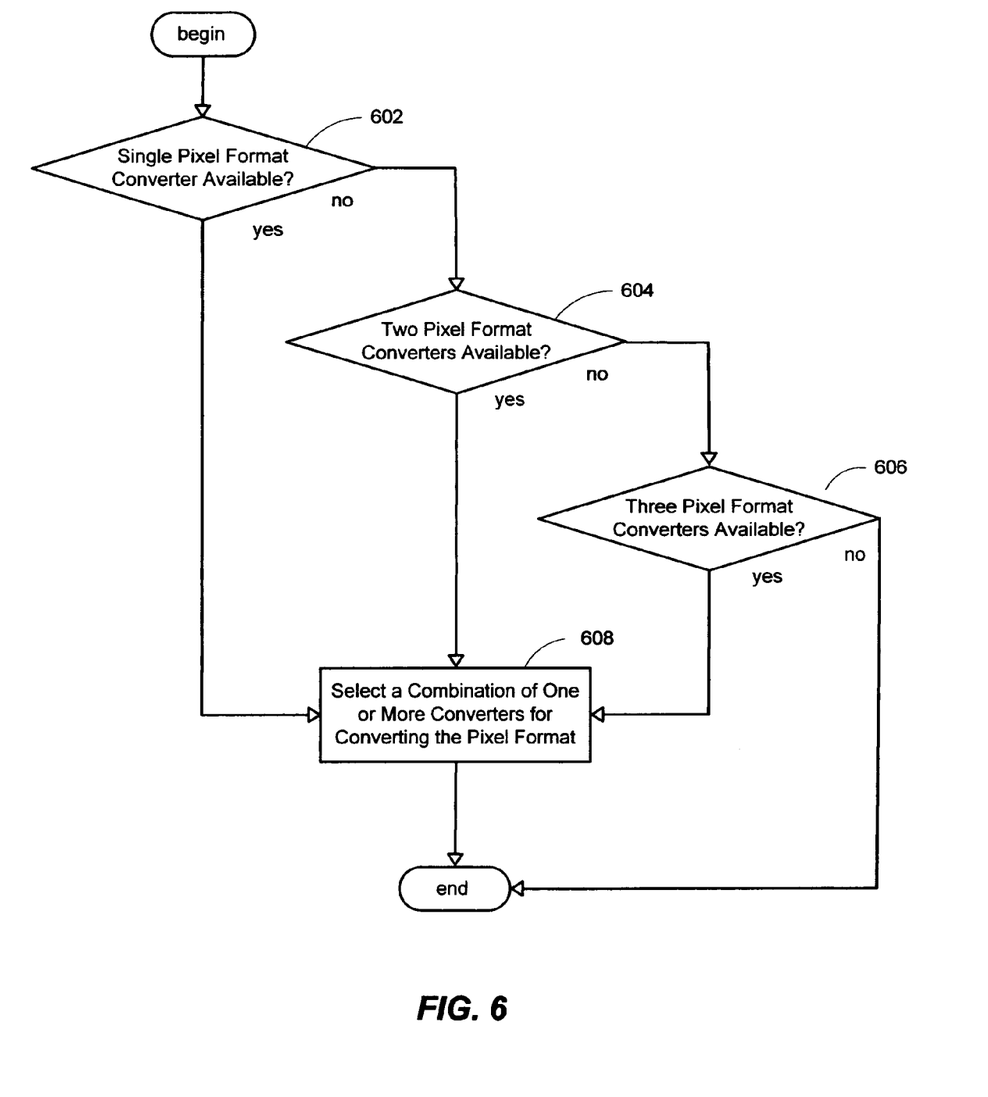
FIG. 6 is a flowchart generally representing exemplary steps undertaken in one embodiment for selecting one or more pixel format converters for performing a pixel format conversion, in accordance with an aspect of the present invention.

At step 504, a combination of one or more pixel format converters may be selected for converting the pixel format of the digital image to the pixel format supported by the imaging component. In an embodiment, a single pixel format converter may be used to convert the pixel format in the image to the pixel format supported by the imaging component, if there may be such a pixel format converter installed and registered in the computer system. Otherwise, several pixel format converters may be used to convert the pixel format in the image to one or more intermediate pixel formats, before the intermediate format may be converted to the pixel format supported by the imaging component. FIG. 6 may present the steps undertaken in one such embodiment in greater detail.

Once a combination of one or more pixel format converters may be selected for performing conversion, one or more pixel format conversions may be performed at step 506 using the combination of the one or more pixel format converters selected to convert the pixel format of the digital image to the pixel format supported by the imaging component. After the pixel conversions may be performed, processing may be finished.

FIG. 6 presents a flowchart generally representing exemplary steps undertaken in one embodiment for selecting one or more pixel format converters for performing a pixel format conversion. At step 602, it may be determining whether there may be a pixel format converter in the list of pixel format converters that may convert the pixel format of the digital image to the pixel format supported by the imaging component. If so, that pixel converter may be selected for performing the pixel format conversion at step 608. If not, it may be determined at step 604 whether there may be a pixel format converter in the list of pixel format converters that may convert the pixel format of the digital image to an intermediate pixel format and whether there may be another pixel format converter in the list of pixel format converters that may convert the image from the intermediate pixel format to the pixel format supported by the imaging component. If so, those two pixel converters may be selected for performing the pixel format conversion at step 608.

If not, it may be determined at step 606 whether there may be two pixel converters that may be selected for converting the pixel format of the digital image to an intermediate pixel format first and then to a common pixel format, and whether there may be a third pixel format converter that may be selected for converting from the common pixel format to the pixel format supported by the imaging component. If so, those three pixel converters may be selected for performing the pixel format conversion at step 608. In an embodiment, each imaging component may install one or more pixel format converters for converting between canonical pixel formats and the pixel formats supported by the imaging component. This may allow conversion of an image format to a common pixel format and then conversion from the common pixel format to a pixel format supported by an imaging component. When choosing intermediate cannonical formats, cannonical formats with the highest fidelity may be selected first. For example, a list enumerating cannonical formats that a converter may support may indicate in one embodiment the fidelity of the bit depth, such as 128 bit. In this way, the system and method may support the highest fidelity available for new image formats introduced.

As can be seen from the foregoing detailed description, the present invention provides an improved system and method for an extensible codec architecture for digital images. The system and method may advantageously allow the installation and discovery of new imaging components that may enumerate their capabilities for performing imaging operations on a digital image. The system and method may thus flexibly support the addition of new image formats and new pixel formats for digital images. The framework provided may also seamlessly support applications using third party implementations of image formats and extensions to existing image formats. Moreover, the system and method may perform automatic conversion of new pixel image formats to pixel image formats that may be recognizable by imaging components installed on the computer system. As is now understood, the system and method thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for performing imaging operations on a digital image, comprising:
a processing unit; executable software code for requesting an imaging operation to be performed on a digital image;
a codec manager operably coupled to the executable software code for receiving the request to perform an imaging operation on the digital image, discovering one or more imaging components for performing the imaging operation on the digital image, the imaging components including a plurality of operations that may be performed by the imaging components on the digital image, assigning a weight for each operation that may be performed by the imaging components on the digital image, and for selecting the imaging component from the plurality of imaging components that has a sum of weights assigned for each performable operation that is greater than the sum of weights assigned for each performable operation performable by another imaging component to perform the requested imaging operation on the digital image; and
a selected imaging component operably coupled to the codec manager, the selected imaging component having registered information in the computer system that may indicate that the selected imaging component may perform imaging operations on the digital image.

2. The system of claim 1 further comprising imaging application programming interfaces operably coupled to the executable software code for receiving the request to perform an imaging operation on the digital image.

3. The system of claim 1 further comprising a codec arbitrator operably coupled to the codec manager for requesting the imaging component to enumerate imaging operations that the imaging component may perform on the digital image.

4. The system of claim 1 further comprising a pixel format converter operably coupled to the codec manager for converting a pixel format of the digital image to another pixel format.

5. The system of claim 1 further comprising a registry operably coupled to the codec manager for providing information about imaging components registered in the computer system.

6. A method in a computer system for performing an imaging operation on a digital image, comprising:
installing a plurality of imaging components in the computer system;
registering the plurality of imaging components in the computer system so that at least one of the imaging components may be discovered for use in performing an imaging operation;
receiving a request for performing an imaging operation on a digital image;
discovering one or more imaging components for performing the imaging operation on the digital image, the imaging components including a plurality of operations that may be performed by the imaging components on the digital image;
assigning a weight for each operation that may be performed by the imaging components on the digital image;
selecting an imaging component from the plurality of imaging components for performing the imaging operation on the digital image, wherein the selected imaging component has a sum of weights assigned for each performable operation that is greater than the sum of weights assigned for each performable operation performable by another imaging component; and
using the selected imaging component for performing the imaging operation on the digital image.

7. The method of claim 6 further comprising determining whether to perform a pixel format conversion on the pixel format of the digital image and, if so, performing the pixel format conversion on the digital image.

8. The method of claim 7 wherein determining whether to perform a pixel format conversion on the pixel format of the digital image comprises determining that the imaging component selected for performing the imaging operation on the digital image comprises an imaging component that may perform the requested imaging operation for a different pixel format for the image type of the digital image.

9. The method of claim 7 wherein performing the pixel format conversion on the digital image comprises:
   searching a list of pixel format converters for one or more pixel format converters that may perform conversion of the pixel format of the digital image to another pixel format; selecting a combination of one or more pixel format converters for converting the pixel format of the digital image to the pixel format supported by the imaging component selected to perform the imaging operation on the digital image; and
   performing one or more pixel format conversions using the combination of the one or more pixel format converters to convert the pixel format of the digital image to the pixel format supported by the imaging component selected to perform the imaging operation on the digital image.

10. The method of claim 9 wherein selecting the combination of one or more pixel format converters for converting the pixel format of the digital image to the pixel format supported by the imaging component selected to perform the imaging operation on the digital image comprises:
   determining whether there may be a pixel format converter in the list of pixel format converters that may convert the pixel format of the digital image to the pixel format supported by the imaging component selected to perform the imaging operation on the digital image, and if so, selecting the pixel format converter as the combination of the one or more pixel format converters for converting the pixel format of the digital image to the pixel format supported by the imaging component selected to perform the imaging operation on the digital image;
   if not, determining whether there may be a first pixel format converter in the list of pixel format converters that may convert the pixel format of the digital image to a first intermediate pixel format and whether there may be a second pixel format converter in the list of pixel format converters that may convert the first intermediate pixel format to the pixel format supported by the imaging component selected to perform the imaging operation on the digital image, and if so, selecting the first pixel format converter and the second pixel format converter as the combination of the one or more pixel format converters for converting the pixel format of the digital image to the pixel format supported by the imaging component selected to perform the imaging operation on the digital image; and
   if not, determining whether there may be a first pixel format converter in the list of pixel format converters that may convert the pixel format of the digital image to a first intermediate pixel format, whether there may be a second pixel format converter in the list of pixel format converters that may convert the first intermediate pixel format to a second intermediate pixel format, and whether there may be a third pixel format converter for converting the second intermediate pixel format to the pixel format supported by the imaging component selected to perform the imaging operation on the digital image, and if so, selecting the first pixel format converter, the second pixel format converter, and the third pixel format converter as the combination of the one or more pixel format converters for converting the pixel format of the digital image to the pixel format supported by the imaging component selected to perform the imaging operation on the digital image.

11. The method of claim 6 wherein installing an imaging component in the computer system comprises installing one or more pixel format converters that may be used to convert the digital image from one pixel format to another pixel format.

12. The method of claim 6 wherein registering the imaging component in the computer system comprises registering one or more pixel formats for which the imaging component may perform operations.

13. The method of claim 6 wherein registering the imaging component in the computer system comprises registering one or more patterns that may be used to determine whether the imaging component may perform the imaging operation on the digital image.

14. The method of claim 6 wherein discovering the imaging component for performing the imaging operation on the digital image comprises using information registered by the imaging component in a registry.

15. The method of claim 6 wherein selecting the imaging component for performing the imaging operation on the digital image comprises requesting the imaging component to enumerate the imaging operations that the imaging component may perform on the digital image.

16. The method of claim 6 wherein selecting the imaging component for performing the imaging operation on the digital image comprises:
   instantiating the imaging component; and
   requesting an enumeration of operations that may be performed by the imaging component on the digital image.

17. The method of claim 6 wherein using the imaging component for performing the imaging operation on the digital image comprises using a codec for performing the imaging operation on the digital image.

18. A computer-readable storage medium storing computer-executable instructions for performing the method of claim 6.

19. A computer program product for implementing a method for providing an extensible codec architecture for digital images, the computer program product comprising one or more computer readable storage media storing thereon computer-executable instructions that, when executed by one or more processors of the computing system, cause the computing system to perform the method, the method comprising:
   installing an imaging component in the computer system among a plurality of other imaging components, the imaging component allowing new image formats and new pixel formats for digital images to be flexibly added to the imaging component, the imaging component further allowing automatic conversion of new pixel image formats to pixel image formats that may be recognizable by other imaging components;
   registering the imaging component in the computer system so that the imaging component may be discovered among the plurality of imaging components for use in performing an imaging operation without having to instantiate the discovered imaging component;
   receiving a request for performing an imaging operation on a digital image;
   discovering the imaging component for performing the imaging operation on the digital image, the imaging component including a plurality of operations that may be performed by the imaging component on the digital image;
   assigning a weight for each operation that may be performed by the imaging component on the digital image;

selecting an imaging component from the plurality of imaging components for performing the imaging operation on the digital image, wherein the selected imaging component has a sum of weights assigned for each performable operation greater than the sum of weights assigned for each performable operation performable by another of the plurality of imaging components; and using the selected imaging component for performing the imaging operation on the digital image.

20. The computer program product of claim 19, wherein the digital image comprises different image formats included in a single image file of multiple images.

\* \* \* \* \*